United States Patent Office 2,900,404
Patented Aug. 18, 1959

2,900,404

DIARYL DISULFIDES CONTAINING ARYL SULFONOXY GROUPS

Arthur H. Weinstein, Akron, Ohio, assignor to The Goodyear Tire & Rubber Company, Akron, Ohio, a corporation of Ohio No Drawing. Application January 30, 1958
Serial No. 712,061

3 Claims. (Cl. 260—456)

This invention relates to diaryl disulfides. More particularly, it relates to diaryl disulfides containing aryl sulfonoxy groups and to methods for their preparation. It also relates to intermediates used in the preparation of these disulfides.

The diaryl disulfides of this invention can be defined by the formula $$[Ar\text{—}SO_2\text{—}O\text{—}R\text{—}Ar'\text{—}S\text{—}]_2$$

in which R is selected from the group consisting of —$(CH_2)_n$— and —$(CH_2)_n$—O— wherein $n$ is a whole number from 1 to 4, Ar is an aryl radical selected from the group consisting of naphthyl, phenyl, the lower alkyl substituted phenyls (such as the tolyls and ethyl phenyls), the halo substituted phenyls, and the nitro substituted phenyls. Ar′ is an arylene radical selected from the group consisting of naphthylene, phenylene, the halo substituted phenylenes and the lower alkyl substituted phenylenes (such as the tolylenes and ethyl phenylenes).

The general method of synthesis used in the preparation of the diaryl disulfides containing aryl sulfonoxy groups of this invention involves the aryl sulfonation, by means of an aryl sulfonyl chloride, of arylalkanols and aryloxyalkanols. This step is followed by chlorosulfonation, by means of chlorosulfonic acid, of the resultant aryl sulfonates of the arylalkanols and aryloxyalkanols to the respective sulfonyl chloride of the aryl sulfonates of these arylalkanols and aryloxyalkanols. A subsequent selective reduction, by means of a reducing agent such as hydroiodic acid, of these sulfonyl chlorides results in the formation of the desired symmetrical di aryl disulfides containing sulfonoxy groups.

This synthesis will be further explained by reference to the following illustrated chemical reactions.

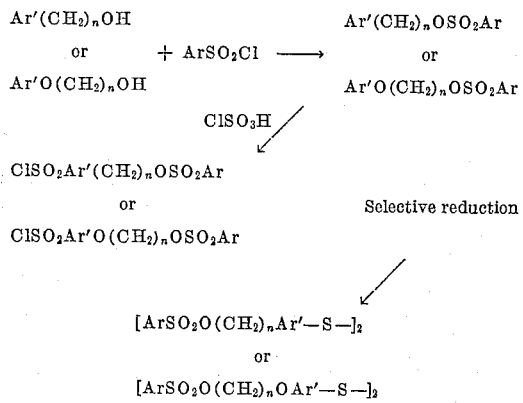

wherein $n$ is a whole number from 1 to 4. Ar is an aryl radical selected from the group consisting of naphthyl, phenyl, the lower alkyl substituted phenyl such as the tolyls and ethyl phenyls, the halo substituted phenyls and the nitro substituted phenyls. Ar′ is an arylene radical selected from the group consisting of naphthylene, phenylene, the halo substituted phenylenes and the lower alkyl substituted phenylenes such as the tolylenes and ethyl phenylenes.

This invention will be further illustrated by reference to the following example, which is to be interpreted as representative rather than restrictive of the scope of this invention. In this example, 1-beta hydroxyethoxy naphthalene is arylsulfonated by means of para-toluene sulfonyl chloride. The resulting 1-beta-para-toluene-sulfonoxyethoxy naphthalene is chlorosulfonated by means of chlorosulfonic acid, and the resulting 4-chlorosulfonyl 1-beta-para toluenesulfonoxyethoxy naphthalene is reduced by means of hydroiodic acid to bis (4-beta-para-toluene-sulfonoxyethoxy-1-naphthyl) disulfide, which is a diaryl disulfide containing an arylsulfonoxy group.

*Preparation of 1-beta-para-toluenesulfonoxyethoxy naphthalene*

To a solution of 19.0 grams (0.10 mol) of para-toluene-sulfonylchloride in 72 milliliters of anhydrous pyridine which had been previously cooled to −10° C. in an ice-salt bath, was added gradually with stirring, 17.1 grams (0.091 mol) of 1-beta-hydroxyethoxy naphthalene (prepared by reacting 1-sodium naphtholate with ethylene bromohydrin). The mixture was maintained at −10° C. and stirred for 20 minutes. At the end of this time, 210 milliliters of 5–N sulfuric acid which had previously been chilled to 0° C. was added, with the stirring being maintained during the addition of the acid. When the stirring was discontinued, an oily layer formed, which was crystallized to a white solid by rubbing the inner wall of the container with a glass rod. This white solid was collected, washed with water, desiccated and weighed. A product yield of 22.4 grams was obtained which had a melting range of from 77 to 87° C. Recrystallization of this crude white solid from 340 milliliters of hot methanol yielded 13.9 grams of white rhombic platelets melting at 98.7–99.2° C. corrected (40.7% yield). On subsequent analysis of this material, a carbon content of 66.52%; a hydrogen content of 5.15% and a sulfur content of 9.025% was found. This material was believed to be 1-beta-para-toluenesulfonoxyethoxy naphthalene $$(C_{19}H_{18}O_4S)$$

which theoretically should have a carbon, hydrogen and sulfur content of 66.65; 5.30 and 9.36% respectively.

*Preparation of 4-chlorosulfonyl 1-beta-para-toluene-sulfonoxyethyloxy naphthalene*

To a solution of 48.6 grams (0.142 mol) of 1-beta-para-toluenesulfonoxyethoxy naphthalene (prepared as previously described) in 140 milliliters of chloroform which had previously been cooled in an ice-salt bath to −5° C., was added dropwise with stirring, 33.0 grams (0.284 mol) of chlorosulfonic acid. This mixture was permitted to warm to 25° C. and to stand at this temperature with continued stirring for 25 minutes. The mixture was then poured cautiously, with stirring, into a mixture of 700 grams of crushed ice and water and the stirring discontinued, and then the mixture separated into layers. The aqueous layer was extracted with chloroform several times. The combined chloroform extract was washed with water and dried free of water by means of anhydrous sodium sulfate. Upon removing the chloroform, by means of evaporation, 47.6 grams of a viscous yellow oil was obtained. By treating this oil with 100 milliliters of a mixture of chloroform/n-hexane in a ratio of 3:2 by volume, a white precipitate was obtained. This precipitate, when dried, weighed 36.5 grams (58.3% yield) and had a melting point of 109.6–110° C. corrected. Upon subsequent analysis, this material was found to have a chlorine content of 8.10% and a sulfur content of 14.55%. This material was believed to be $C_{19}H_{17}ClS_2O_6$.

or 4-chlorosulfonyl-1-beta-para-toluenesulfonoxyethoxy naphthalene which has a theoretical chlorine content 8.04% and a sulfur content of 14.54%. This material is useful in the preparation of bis (4-beta-para-toluenesulfonoxyethyloxy-1-naphthyl) disulfide.

*Preparation of bis (4-beta-para-toluenesulfonoxyethoxy-1-naphthyl) disulfide*

To a solution of 18.2 grams (0.041 mol) of 4-chlorosulfonyl-1-beta-para-toluenesulfonoxyethoxy naphthalene (prepared as previously described) in a mixture of 240 milliliters of benzene and 660 milliliters of glacial acetic acid was added 79.2 grams (0.31 mol) of 50% aqueous hydroiodic acid. A deep red solution resulted, which was allowed to stand at 25° C. for 16 hours. The free iodine which was formed was eliminated by adding a 10% aqueous solution containing 55 grams of sodium thiosulfate pentahydrate. The organic and aqueous phases were separated and the organic phase, which was a benzene solution, was washed with water and dried over anhydrous sodium sulfate. The benzene was removed by evaporation and 20.8 grams of a viscous yellow oil was isolated. This oil was dissolved in 3.6 liters of boiling isopropanol. This isopropanol/oil solution was cooled at 0° C. and 11.5 grams (75% yield) of light yellow crystals melting at 138–142° C. was obtained. By recrystallizing this crude product from hot isopropanol, crystals with a melting point of 142.6–144.6° C. corrected were obtained. On subsequent analysis, a carbon content of 60.73%; a hydrogen content of 4.41% and a sulfur content of 17.29% was obtained on these purified crystals. These crystals were believed to be bis (4-beta-para-toluenesulfonoxyethoxy-1-naphthyl) disulfide

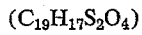

$(C_{19}H_{17}S_2O_4)$ which should give a theoretical carbon, hydrogen and sulfur content of 61.1; 4.59; 17.17% respectively.

A wide variety of other diaryl disulfides containing arylsulfonoxy groups may be produced by following the same general procedures as shown in the example above. Other arylalkanols which may be employed in the practice of this invention are 2-alpha-naphthyl ethanol and 2-beta-naphthyl ethanol, which may be prepared by the reduction of respective available alpha and beta naphthyl acetic acids by means of lithium aluminum hydride or 2-beta phenyl ethanol; benzyl alcohol and alpha-naphthyl methanol. Other aryloxyalkanols which may be employed in the practice of this invention are 2-alpha-naphthoxy ethanol; 2-beta-naphthoxy ethanol; beta-phenoxy ethanol; beta-3,5-xylyloxy ethanol; gamma-2-bromophenoxy-n-propanol; beta-3-chlorophenoxy ethanol; beta-3-tolyloxy ethanol and 4-phenoxy-n-butanol. These aryloxyalkanols may be prepared by treating ethanol solutions of the alkali metal salts of such readily available phenols or substituted phenols as phenol, alpha naphthol, beta naphthol, 3,5-xylenol, 2-bromophenol, 3-chlorophenol and 3-cresol with suitable alkylene halohydrins as ethylene bromohydrin, ethylene chlorohydrin, 3-bromo-1-propanol, 3-chloro-1-propanol and 4-chloro-1-butanol. The arylalkanols and aryloxyalkanols are capable of being arylsulfonated by means of readily available aryl sulfonyl chlorides such as benzene sulfonyl chloride, ortho and para-toluene sulfonyl chlorides, para-bromobenzene sulfonyl chloride, para-chlorobenzene sulfonyl chloride, meta and ortho-nitrobenzene sulfonyl chlorides, alpha-naphthalene sulfonyl chloride and beta-naphthalene sulfonyl chloride to produce the aryl sulfonates of the arylalkanols and aryloxyalkanols mentioned above. By chloro-sulfonating these intermediates with chlorosulfonic acid, the sulfonyl chlorides of these arylsulfonates of the arylalkanols and aryloxyalkanols can be obtained. The thus formed sulfonyl chlorides may then be selectively reduced to produce a wide variety of symmetrical diaryl disulfides containing aryl sulfonoxy groups. Specific examples of such disulfides obtained in accordance with this invention are:

Bis(4 - beta - para - toluenesulfonoxyethoxy - 1 - naphthyl) disulfide
Bis(4 - beta - ortho - toluenesulfonoxyethyl - phenyl) disulfide
Bis(1 - beta - para - bromobenzenesulfonoxyethoxy - 2 - naphthyl) disulfide
Bis(4 - meta - nitrobenzenesulfonoxymethyl - phenyl) disulfide
Bis(2 - beta - 1' - naphthylsulfonoxyethyl - 1 - naphthyl) disulfide
Bis(4 - beta - benzenesulfonoxyethoxy - 2,6 - xylyl) disulfide
Bis(4 - gamma - para - chlorobenzenesulfonoxy - n - propoxy-3-bromophenyl) disulfide
Bis(4 - beta - ortho - nitrobenzenesulfonoxyethoxy - 2 - chlorophenyl) disulfide
Bis(4 - beta - 2' - naphthylsulfonoxyethoxy - 2 - tolyl) disulfide
Bis(4 - delta - benzenesulfonoxy - n - butyloxymethyl - 1 - naphthyl) disulfide
Bis(1 - beta - para - toluenesulfonoxyethyl - 2 - naphthyl) disulfide
Bis(4 - beta - para - toluenesulfonoxyethoxy - phenyl) disulfide
Bis(2 - beta - para - toluenesulfonoxyethoxy - 1 - naphthyl) disulfide The general procedure used in the synthesis of the diaryl disulfides of this invention is not critical. The arylalkanols and aryloxyalkanols can be aryl sulfonated, according to well-known procedures, in the same manner that simple alkanols can be aryl sulfonated, for example, by treating an alcohol with any aromatic sulfonyl chloride, either in the presence or absence of a base, or by treating an alkali metal alkoxide of the alcohol with an aromatic sulfonyl chloride, or by carrying out the direct esterification reaction between the aromatic sulfonic acid and the alcohol. It is preferred, however, to treat the arylalkanol or aryloxyalkanol with the aryl sulfonyl chloride in the presence of pyridine. In the chloro-sulfonating of the aryl sulfonates, it is preferred to add the chloro-sulfonic acid in a manner so that the highly exothermic reaction is under control at all times. The subsequent selective reduction of the aryl sulfonoxyl aryl sulfonate can be performed by one of several means such as using zinc and a mineral acid with a limited quantity of zinc or triphenyl phosphine or by using a limited quantity of concentrated aqueous hydroiodic acid. Of these, concentrated aqueous hydroiodic is preferred.

The diaryl disulfides containing aryl sulfonoxy groups, to which this invention relates, are useful as modifiers in the preparation of synthetic polymers, especially synthetic rubber. It is well known in polymerization chemistry that when diolefins and/or monoolefins are polymerized to form addition polymers, a modifier or modifiers are used to regulate the molecular weight of the polymer chains. The mechanism by which these modifiers operate is called chain transfer. These modifiers are usually aliphatic mercaptans but it is also known that aromatic disulfides also act as modifiers. (See "Chemistry of High Polymers," C. E. H. Brown, Interscience Publishers Inc., New York, N.Y., pages 51–57; "Journal of Polymer Science," vol. 2, pages 49–70, Kolthoff and Harris; "Principles of Polymer Chemistry," pages 136–141, Paul J. Flory, Cornell University Press, Ithaca, N.Y.; "Synthetic Rubber," pages 252–257, G. S. Whitby, editor, John Wiley and Sons, New York, N.Y.)

It has been observed that when aryl disulfides are used as modifiers in such polymerizations, the aryl disulfides cleave at the sulfur-sulfur linkage to impart a "half" of the disulfide or thio ether fragment to each end of the polymer chains. (See Bis-Type Modifiers in Polymerization, I and II; Journal of Polymer Science, vol. 17 (1955), pages 221-246 and pages 319-340, respectively.) The diaryl disulfides containing sulfonoxy groups of this invention become particularly significant when used as modifiers in a polymerization reaction of this type. They cause to be imparted to the ends of the polymer chains an aryl sulfonoxy group. These aryl sulfonoxy groups are "reactive"—that is—they react chemically in a similar manner to halogen groups. With respect to interaction between aryl sulfonoxy groups and tertiary amines, alkali metal alkoxides and organic metallic compounds, these aryl sulfonoxy groups react in the same manner as does any halogen group. Therefore, they provide a polymer with functional groups at the ends of the polymer chains which can be further reacted, for instance, such a polymer could be cured by using a polyfunctional tertiary amine as the curing agent instead of the conventional curing agent, or it would be possible to end link such a polymer with a bimetal salt of a bis phenol.

Thus it can be seen that by using the diaryl disulfides containing aryl sulfonoxy groups of this invention as modifiers in the polymerization of addition polymers, it is possible to provide polymers more useful than those polymers prepared with conventional modifiers such as aliphatic mercaptans and aromatic disulfides.

While certain representative embodiments and details have been shown for the purpose of illustrating the invention, it will be apparent to those skilled in the art that various changes and modifications may be made therein without departing from the spirit or scope of the invention.

What is claimed is:

1. The diaryl disulfides containing arylsulfonoxy groups defined by the formula

[Ar—SO$_2$—O—R—Ar'—S—]$_2$ in which R is selected from the group consisting of —(CH$_2$)$_n$— and —(CH$_2$)$_n$—O— wherein $n$ is a whole number from 1 to 4; Ar is an aryl radical selected from the group consisting of naphthyl, phenyl, the mono lower alkyl substituted phenyls, the mono chloro substituted phenyls, the mono bromo substituted phenyls and the mono nitro substituted phenyls; Ar' is an arylene radical selected from the group consisting of naphthylene, phenylene, the mono chloro substituted phenylenes, the mono bromo substituted phenylenes and the lower alkyl substituted phenylenes.

2. Bis (4-beta - para - toluenesulfonoxyethoxy-1-naphthyl) disulfide.

3. Chlorosulfonyl-1-beta - para-toluenesulfonoxyethoxy naphthalene.

No references cited.